(12) United States Patent
Cessac et al.

(10) Patent No.: US 6,722,405 B2
(45) Date of Patent: Apr. 20, 2004

(54) FLEXIBLE HOSE SAFETY KIT

(75) Inventors: Kevin Cessac, Houston, TX (US); Frank Gonzales, Houston, TX (US); Spence M. Nimberger, Houston, TX (US); Robert L. Ward, Missour City, TX (US)

(73) Assignee: PGI International, Ltd., Houston, TX (US)

( * ) Notice: Subject to any disclaimer, the term of this patent is extended or adjusted under 35 U.S.C. 154(b) by 150 days.

(21) Appl. No.: 10/117,772

(22) Filed: Apr. 5, 2002

(65) Prior Publication Data

US 2003/0188799 A1 Oct. 9, 2003

(51) Int. Cl.$^7$ ................................ B65B 1/04
(52) U.S. Cl. .................... 141/301; 141/382; 137/68.14; 137/614.04; 251/212
(58) Field of Search .................... 137/68.14, 614.04; 251/212; 141/301, 382

(56) References Cited

U.S. PATENT DOCUMENTS

| 5,357,998 A | 10/1994 | Abrams | 137/68.1 |
| 6,260,569 B1 | 7/2001 | Abrams | 137/68.14 |
| 6,308,753 B1 | 10/2001 | Nimberger et al. | 141/382 |

OTHER PUBLICATIONS

2001—0035210 A–1; Abrams, Nov. 01, 2001.

2002—0007847; Abrams, Jan. 24, 2001.

*Primary Examiner*—Steven O. Douglas
(74) *Attorney, Agent, or Firm*—Browning Bushman, P.C.

(57) ABSTRACT

A safety kit 10 is provided for use with a flexible hose 2 for interconnecting a portable tank 14 with a another tank 12 to transmit fluids between the tanks. The safety kit includes a control housing 5 adapted for securing to one end of the hose, and a cable support housing 36 for securing to the opposing end of the hose. A valve member 20 is moveable relative to a seating surface for opening and closing flow through the control housing. A cable 18 is provided for positioning within the flexible hose 2. The cable may be in compression in one embodiment and in tension in other embodiments. If in compression, the cable support housing includes a cable loading mechanism 210, 250. When the cable is in tension, the trigger moves in response to movement of the cable to close off flow to the flexible hose.

34 Claims, 21 Drawing Sheets

SECT A-A

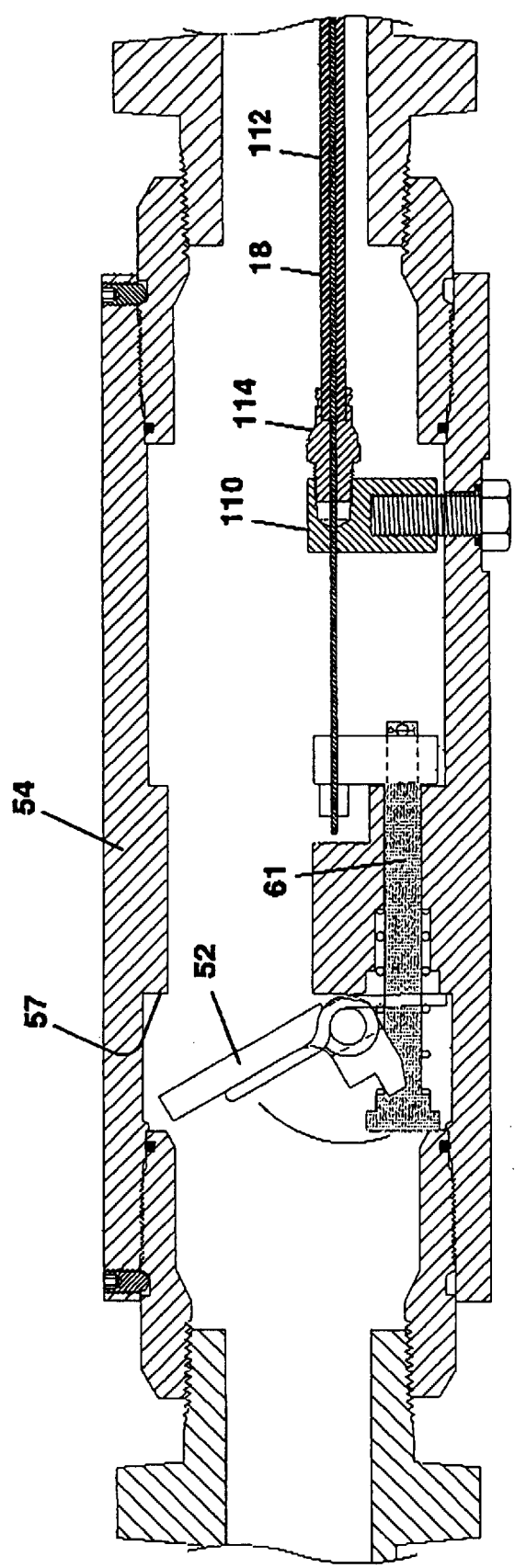
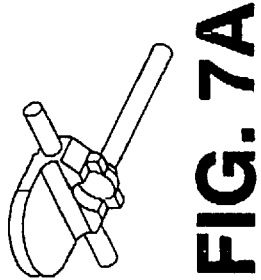
FIG. 7
FIG. 7A

FLEXIBLE HOSE SAFETY KIT

SUMMARY OF THE INVENTION

This invention relates to improvements to a flexible hose for interconnecting a portable tank with another tank to transmit fluids between the tanks. More particularly, this invention relates to a safety kit for automatically shutting off flow from the upstream tank to the downstream tank upon breakage of the flexible hose and/or breakage of the cable within the hose.

BACKGROUND OF THE INVENTION

Various techniques have been used for transferring hazardous materials between a portable roadway vehicle tank and a fixed storage tank. Since the release of hazardous materials could result in a life-threatening situation, special precautions are taken to ensure that little if any hazardous material is released to the atmosphere during transfer of the material along the flexible hose assembly that connects the tanks. The flexible hose may be only a portion of the fluid transmission system between the tanks, but is an important link in the transfer of fluids to or from a portable tank, such as mounted on a roadway vehicle.

One prior art system marketed by Smart-Hose Technologies, Inc. utilizes a cable in compression which normally unseats valve members located at each end of the cable. In the event of hose separation, the valve members are released to stop the flow of product in both directions. The cable acts as a spring to maintain the valves off their seats, and the separation of the hose is intended to release the biasing force of the valves which then move to the closed position. A compressed cable extends between the hose ends and is installed during manufacture so that the user must purchase the assembly which includes the hose. In addition, it is difficult to verify the operational integrity of the system, since there is limited ability to check whether one of the valves has been frozen in the open position. During handling and coiling of the hose, special care must be taken not to bend the hose and compress the cable over a sharp radius or the cable will lose its ability to hold the valves open. If there is a failure of the hose, the entire system must be replaced, not merely the separated hose. Variations of the smart hose system are disclosed in U.S. Pat. Nos. 5,357,998 and 6,260,569, as well as publications 2001/00/35210 and 2002/00/7847.

Various other systems have been devised which are intended to close shutoff valves along the length of a flexible hose based upon a drop in monitored pressure when the hose breaks. Pressure monitoring systems for automatically closing the ends of a flexible hose have various reliability concerns. Near the completion of the unloading operation when the liquid level gets low in the tank, the sucking action at the pump inlet creates a vortex or whirlpool effect in the liquid, causing vapor to enter the pump in a random fashion. The entry of shots of vapor causes pump cavitation-like pressure spikes and drops which will shut-in a device that is triggered by the outlet pressure dropping below a given level. The device could be manually overridden when the tank is near empty to prevent the premature trip of the shutoff device. A separate problem, however, involves determining when the tank is near empty since the unloading time is a function of pressure and pump condition, and typically lasts for over 30 minutes. Even if one could determine when to engage and override, this will create a situation where the operator could override the device at will and defeat the purpose of a system which automatically closes off the ends of the hose. Moreover, even after the tank is empty, the pump is typically run for several minutes to push most of the liquid in the hose into the receiving vessel. This is done not only since the customer typically has paid for the product, but because venting of the liquid from the hose causes problems with nearby commercial or residential facilities due to the smell of vapor in the area of the tanks. Running a pump in this situation will thus always actuate a device that is triggered by low pressure and manual override options do not practically solve the problem.

The disadvantages of the prior art are overcome by the present invention. An improved flexible hose is hereinafter disclosed for transmitting hazardous fluids, such as propane and hydrodrous ammonia. More importantly, the present invention discloses a safety kit which automatically cuts off flow in the flexible hose in response to a hose separation or a break in the cable. The kit may be installed by the customer for use with an existing hose.

SUMMARY OF THE INVENTION

The present invention uses a flexible hose system for transmitting fluids from a portable tank to a stationary tank or from a stationary tank to a portable tank, or between two portable tanks. The hose assembly of the present invention need not be installed as part of the trailer equipment, and rather the flexible hose inclusive of the safety kit may be merely carried by the trailer operator and used during offloading or onloading independent of the equipment on the trailer. Also, the flexible hose system may be certified one time by a certified governmental agency engineer, and the system need not be inspected by a certified governmental inspector at installation time.

It is an object of the present invention to provide a safety kit for use with a flexible hose to interconnect a portable tank and another tank. The safety kit includes a control housing adapted for securing to one end of the hose, i.e., the upstream end, with the control housing containing a valve member moveable relative to a seating surface for opening and closing flow through the control housing. In a preferred embodiment, a cable is positioned in tension within the flexible hose and retains a trigger in a neutral position to keep the valve member open, such that fluids may be transmitted between the portable tank and the another tank. The trigger is also moveable to a hose break position in response to tensile force of the cable on the trigger for allowing the valve to move to the closed position. The cable support housing is adapted for securing to an opposing end of a flexible hose opposite the control housing, and secures the cable in a fixed axial position. Fluid pressure is thus transmitted through the hose when the trigger is in the neutral position, and a break in the hose results in movement of the trigger by the cable to the hose break position, thereby allowing the valve member to automatically close.

It is a feature of the invention that the trigger also includes a cable break position for closing the valve member with the cable breaks. The trigger is preferably biased to the cable break position.

A significant feature of the invention is that the safety kit includes a cable length compensator for preventing actuation of the trigger to the cable break position in response to a change in the position of the hose. In a preferred embodiment, the cable length compensator is an incompressible outer sheath which encloses the cable and extends between the cable support housing and the control housing. In alternate embodiments, the cable length compensator may include a long-throw trigger or a drum for winding a portion of the cable about the drum when the flexible hose is bent.

It is a further feature of the invention that a backcheck valve may be provided in the opposing end of the flexible hose for automatically closing to shut off flow in response to a break in the flexible hose.

It is a further feature of the invention that the safety kit may include either a piston-type valve or a flapper-type valve.

It is an object of the invention to provide an improved method to automatically close off flow through a flexible hose when interconnecting a portable tank with another tank. The method involves positioning a trigger with respect to the control housing, with the trigger being moveable from a neutral position for retaining the valve member open to a hose break position for allowing the valve member to move to the closed position. The end of the cable is secured to the cable support housing and the trigger such that the valve member, which may be biased closed, is held open by the cable when the trigger is in the neutral position. According to the method of the invention, the cable may be installed on a flexible hose in the field, and the cable cut to a selected length after measuring the length of the hose. Also, the position of the cable with respect to the cable support housing is adjustable, so that the user may test the hose for safety by bending the flexible hose and observing movement of the valve member and thereafter adjusting the position of the cable in response to the observed movement of the valve member.

In another embodiment, the safety kit retains the cable in compression to retain the valve member in the open position so that fluids may be transmitted between the portable tank and the another tank. The cable support housing includes a cable loading mechanism for placing the cable into compression to hold the valve member open.

It is a feature of this latter embodiment that the cable loading mechanism includes a screw jack base fixed with respect to the cable support housing and a screw jack threadably moveable on the screwjack base. In another embodiment, the cable loading mechanism may include a ratchet mechanism including a ratchet arm connected to the cable and a ratchet lever for advancing the ratchet arm to place the cable in compression within the flexible hose.

It is a significant advantage of the present invention that the safety kit may be purchased by the user of this hose and may be installed by the user without specialized equipment.

Yet another advantage of the invention is that the safety kit has a relatively low cost compared to prior art safety hoses which includes a cable in compression and a valve at both ends of the safety hose.

Another advantage of the invention is that the safety kit does not include components which must be installed on the portable vehicle or the stationary tank. All of the components of the kit are mounted on or within the flexible hose. Since the safety kit may be used with a conventional flexible hose, the utility of the hose with the flexible kit is significantly enhanced.

These and further objections, features, and advantages of the present invention will become apparent from the following detailed description, wherein reference is made to the figures in the accompanying drawings.

BRIEF DESCRIPTION OF THE DRAWINGS

FIG. 6A illustrates the changing apparent length of the cable in response to a bend in the hose. FIG. 6B illustrates another change in apparent length of the cable in response to multiple bends in the hose.

FIG. 7 illustrates a control housing with a flapper-type valve held open by a cable in tension. FIG. 7A is a pictorial view of the flapper-type valve generally shown in FIG. 7.

BRIEF DESCRIPTION OF PREFERRED EMBODIMENTS

Figure 1:
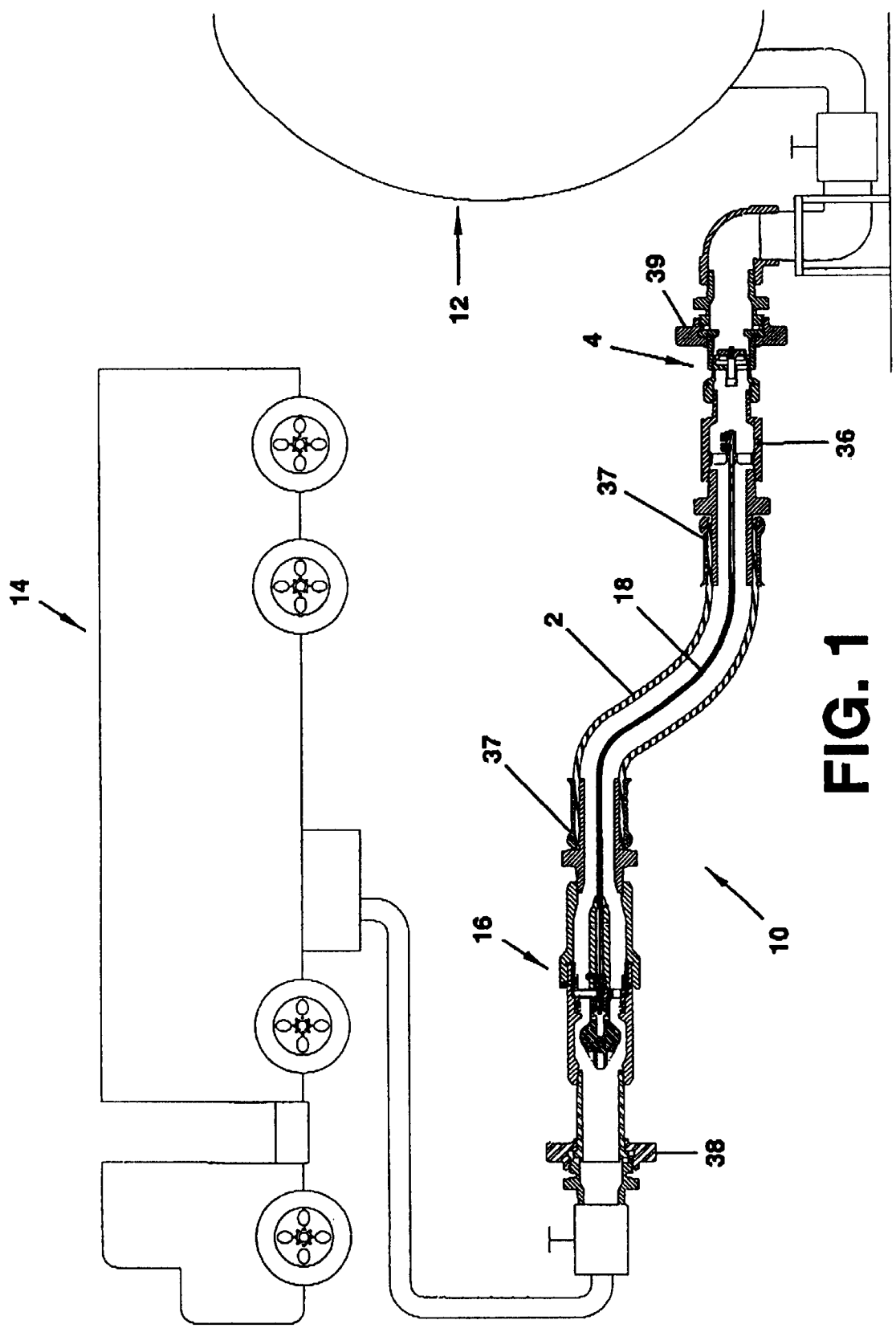
FIG. 1 illustrates a flexible hose extending between a portable tank and a stationary tank. The control valve is installed in the upstream end of the housing, and a back-check valve is installed in the downstream end of the housing.

FIG. 1 depicts a flexible hose 2 with an automatic safety kit 10 according to the present invention for closing off flow through the hose. The flexible hose 2 may thus be used for transmitting hazardous fluids between a fixed storage tank 12 and a portable tank 14, such as carried by a vehicle. The safety kit 10 includes a valve/trigger assembly 16 which may be triggered by movement of the cable 18 to shut off flow through the hose 2, such as when the hose 2 ruptures or when the cable 18 breaks or becomes disconnected. The valve/trigger assembly is provided on the upstream end of the hose 2, and preferably a back check valve 4 is provided on the downstream end of the hose opposite the valve/trigger assembly 16 with respect to the cable support housing 36. Conventional hose connectors 37 may be used at each end of the flexible hose 2 for attaching the end of the hose to a suitable housing, such as control housing 5 and cable support housing 36. Hammer unions 38 and 39 may be used at opposing ends of the hose to facilitate connection to the portable vessel or to the another vessel. A back check valve 4 is preferably placed on the outlet end of the hose to provide an additional level of safety. The back check valve will prevent release of product flowing back out of the receiving vessel in the event of hose separation and also ensures that the correct end of the hose assembly is attached to the downloading vessel. In a preferred embodiment as discussed subsequently, the cable 18 is in tension when the trigger is in the neutral position. In the embodiment discussed first below, however, the cable 18 is in compression when the trigger is in the neutral position.

Figure 2:
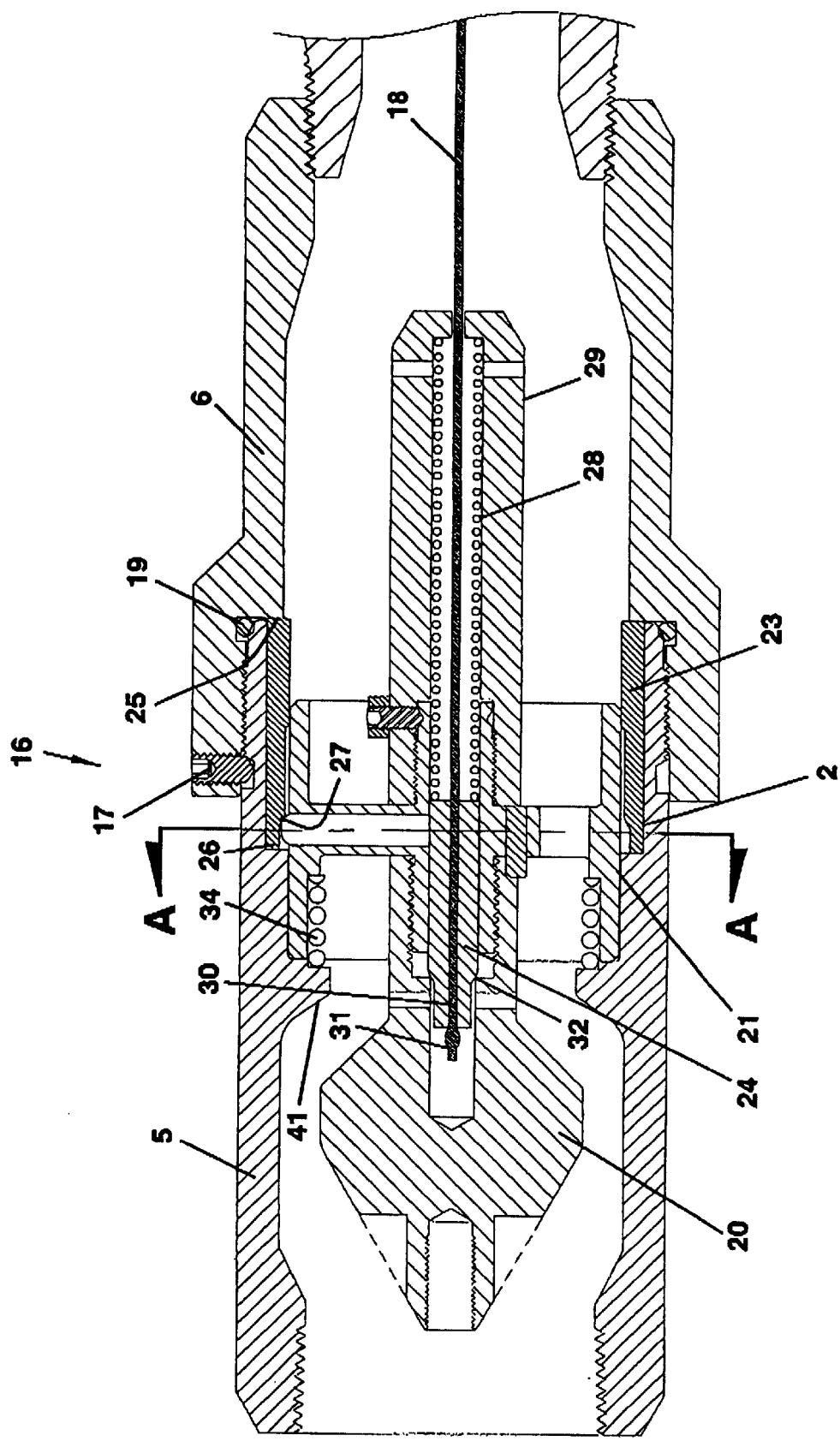
FIG. 2 illustrates a valve member held open by a cable in tension.
Figure 2A:
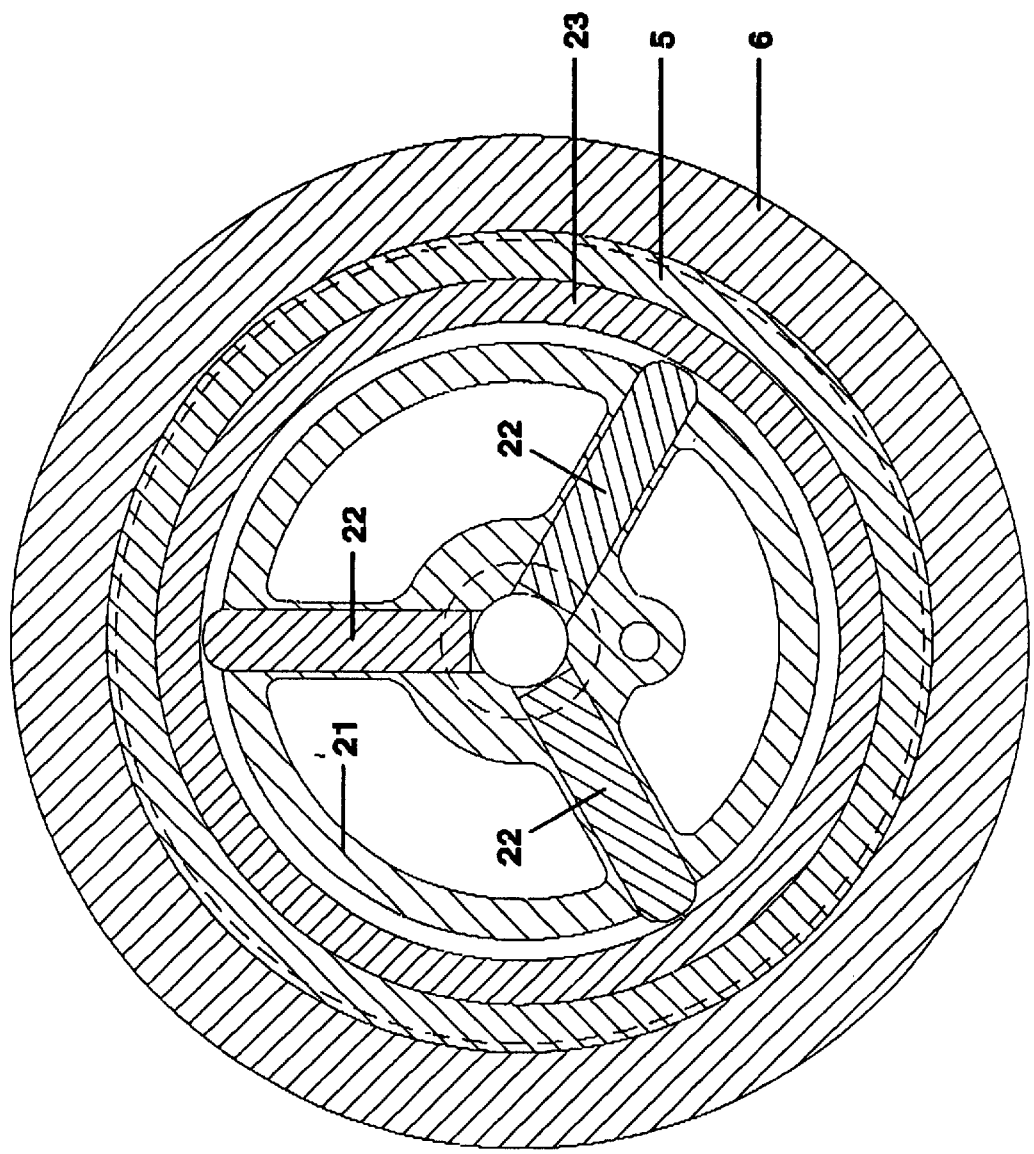
FIG. 2A is a cross-section of the control housing taken along lines A—A in FIG. 2.
Figure 2B:
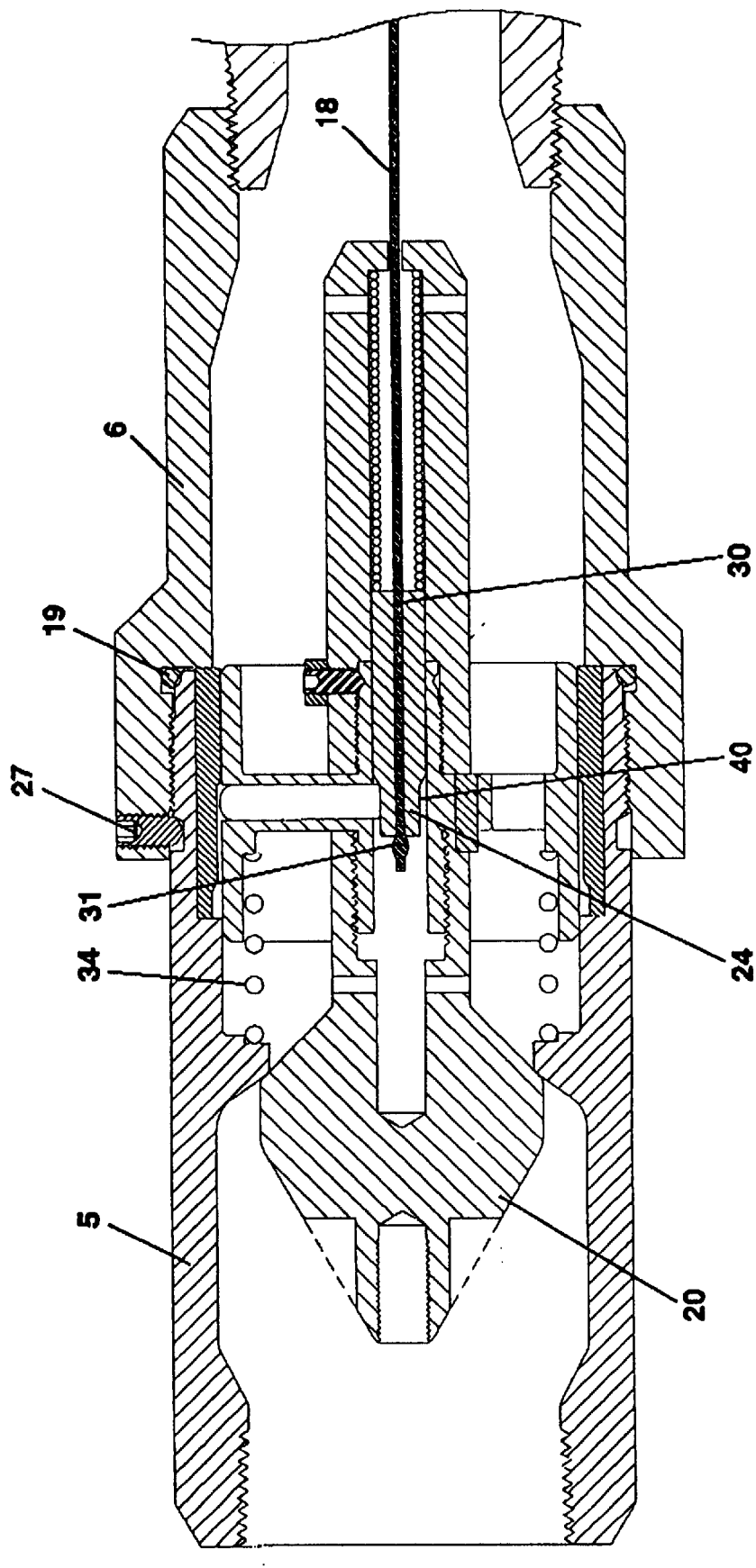
FIG. 2B illustrates the control housing shown in FIG. 2 in the hose break position, such that the valve member is automatically closed.

FIG. 2 is an enlarged view of a preferred, piston-type valve/trigger assembly 16. A piston-type or poppet valve 20 is threadably connected to a trigger housing 21. As shown in FIG. 2A, the trigger housing 21 houses three radially spaced trigger pins 22 which contact or are adjacent the inner surface of trigger sleeve 23 and the outer diameter of trigger 24. Trigger sleeve 23 is retained within a first control housing 5 and a second control housing 6 by stop surfaces 25 and 26. While trigger 24 is in its neutral position as shown in FIG. 2, the trigger 24 restrains the trigger pins 22 from moving radially inward, and the interference between the trigger 24 and inner surface 27 of the trigger sleeve 23 restrains the valve/trigger assembly 16 from moving to its hose break position, as shown in FIG. 2B. A spring 28 may be included in spring housing 29 to bias trigger 24 to its neutral position. Trigger 24 is restrained in the spring-biased direction by shoulder 32 on the poppet valve 20. The spring 34 will biases the valve 20 to the closed position, but fluid flow also will force the valve closed if the trigger were released from its neutral position by the compressed cable. A set screw 17 may be used to fix the interconnection of the housing 5 and the housing 6. O-ring 19 serves to retain pressure integrity in the control housing. FIG. 2B shows the trigger 24 in the hose break position and the valve closed upon failure of the hose 2.

Cable 18 as shown in FIG. 2 is routed through the flexible hose 2, passing through a bore 30 in the trigger 24, and retained at one end with braising ball 31 at the end of the cable 18. The other end of cable 18 is secured to a cable support housing 36 at the opposing end of the flexible hose 2. A failure of the flexible hose 2, e.g., rupture, stretch, or complete separation of the hose 2, will cause the support housing 36 and control housing 5 at the end of the hose 2 to move apart axially, and the cable 18 will then pull the trigger 24 as shown in FIG. 2 in tension away from its neutral position. When the trigger 24 reaches its hose break position as shown in FIG. 2B, a reduced diameter neck portion 40 of the trigger 24 will be aligned with the pins .22, allowing them to move radially inward. This unseats the pins 22, eliminating the interference between the trigger 24 and inner surface 27 of the trigger sleeve 23. The valve 20 is then urged to the closed position by the combination of the force of spring 34 and the flow through the control housing 5. The trigger is thus biased in its home or neutral position by spring 28 within the spring housing 29. Spring 34 biases the valve member to the closed position, and spring 28 biases the trigger to the hose break position. The valve 20 thus moves axially until it comes to rest against the valve seat 41, cutting off further flow through the flexible hose 2.

Figure 3:
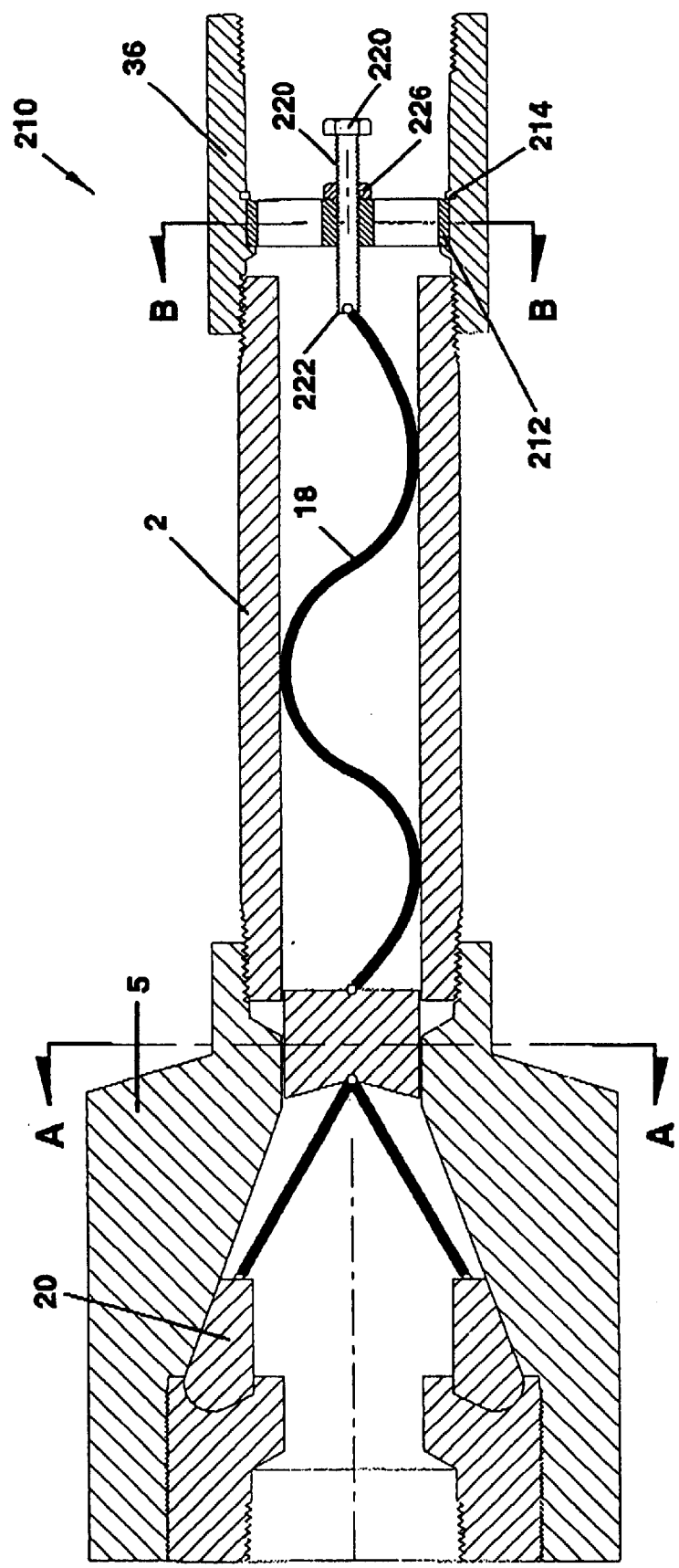
FIG. 3 illustrates a loading mechanism for compressing a cable to hold a valve open.
Figure 3B:
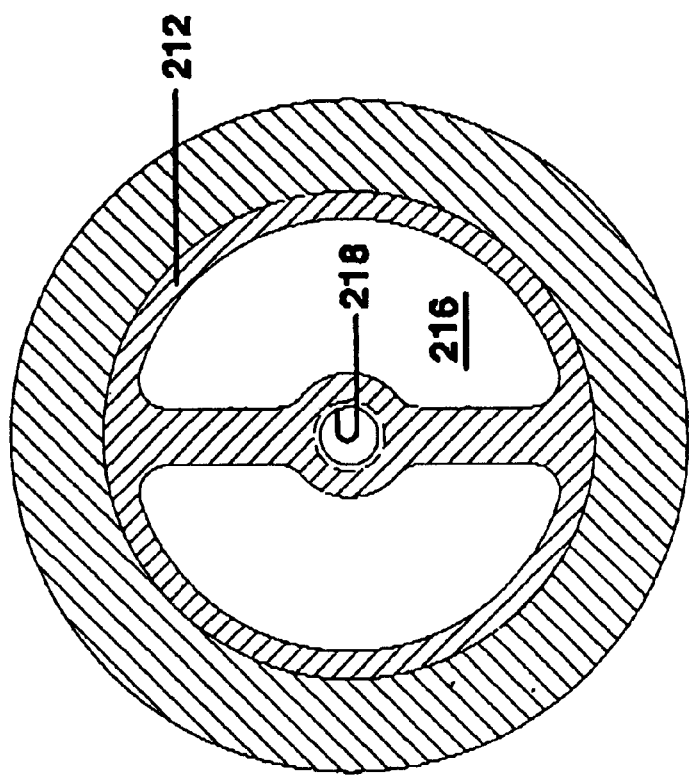
FIG. 3B is a cross-section along lines B—B in FIG. 3.
Figure 3A:
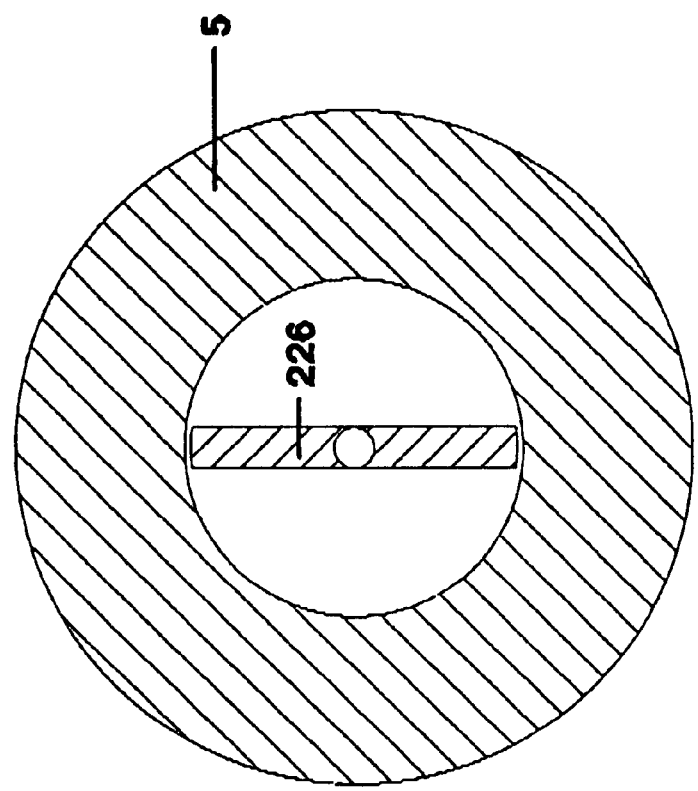
FIG. 3A is a cross-section along lines A—A in FIG. 3.

FIG. 3 depicts a suitable loading device 210 for loading the cable 18 in compression to hold open another type of valve 20, such as a valve using wedge-shaped valve bodies as disclosed in the prior art patents discussed above. As shown in FIG. 3 and 3B, a spider 212 forms a screwjack base which is fixed in the cable support housing 36 by snap ring 214. The screwjack base includes a plurality of through ports 216 for passing fluid through the base, and a thread 218 for receiving a screwjack 220, with the end 222 of the screwjack secured to the end of the cable 18. Screwjack 220 preferably includes a head 224 for receiving a conventional wrench or other torque supplying member to thread the screwjack 220 relative to the base 212. A lock nut 226 may be used for locking the screwjack in place when the desired amount of compression is exerted on the cable 18, with the cable effectively acting as a compressed spring to hold the valve 20 open. As shown in FIGS. 3 and 3A, the opposing end of the cable 18 is attached to valve support member 226 which supports the valve members 20.

Figure 3C:
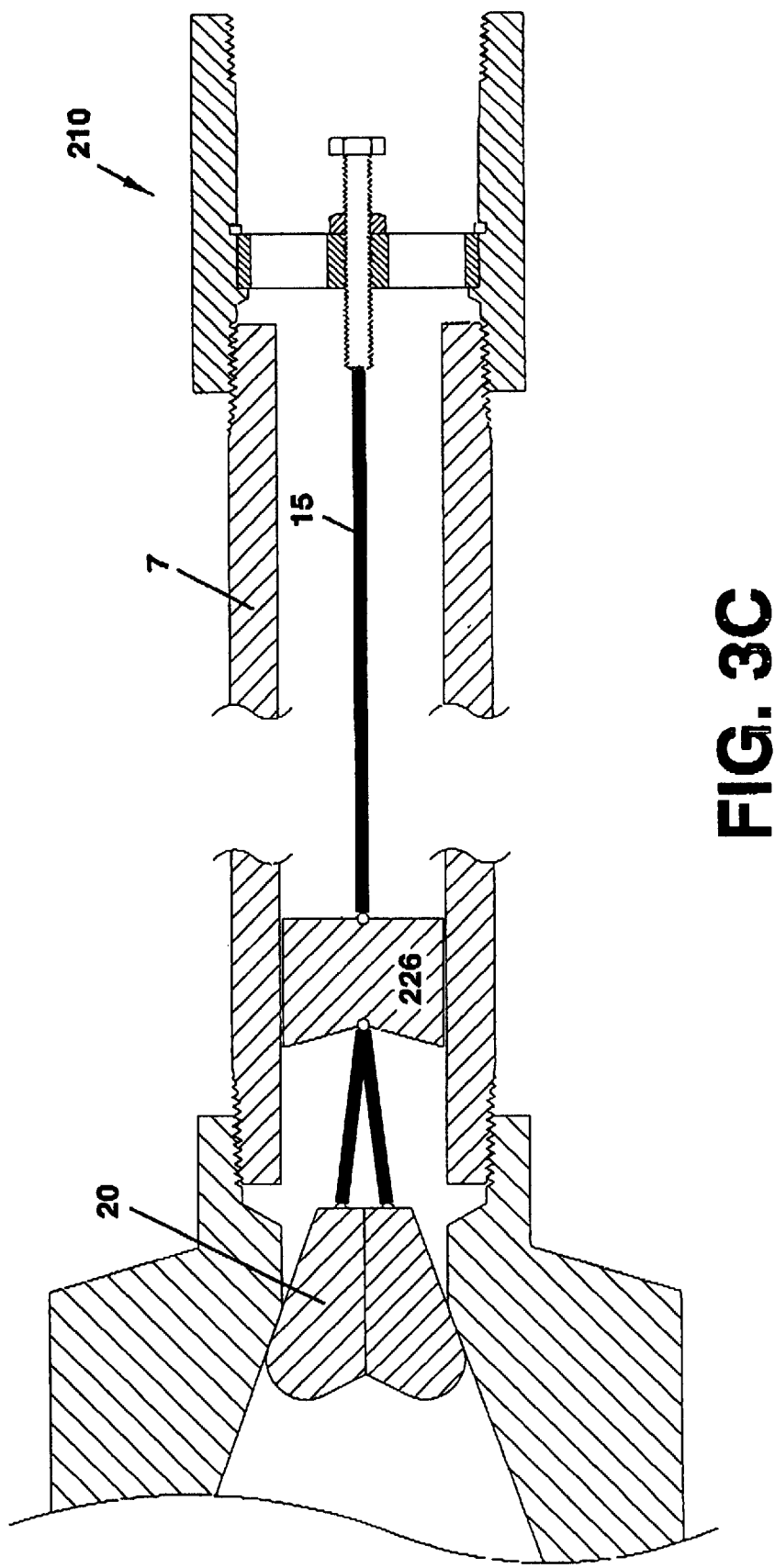
FIG. 3C shows the hose break and the valve closed.
Figure 3D:
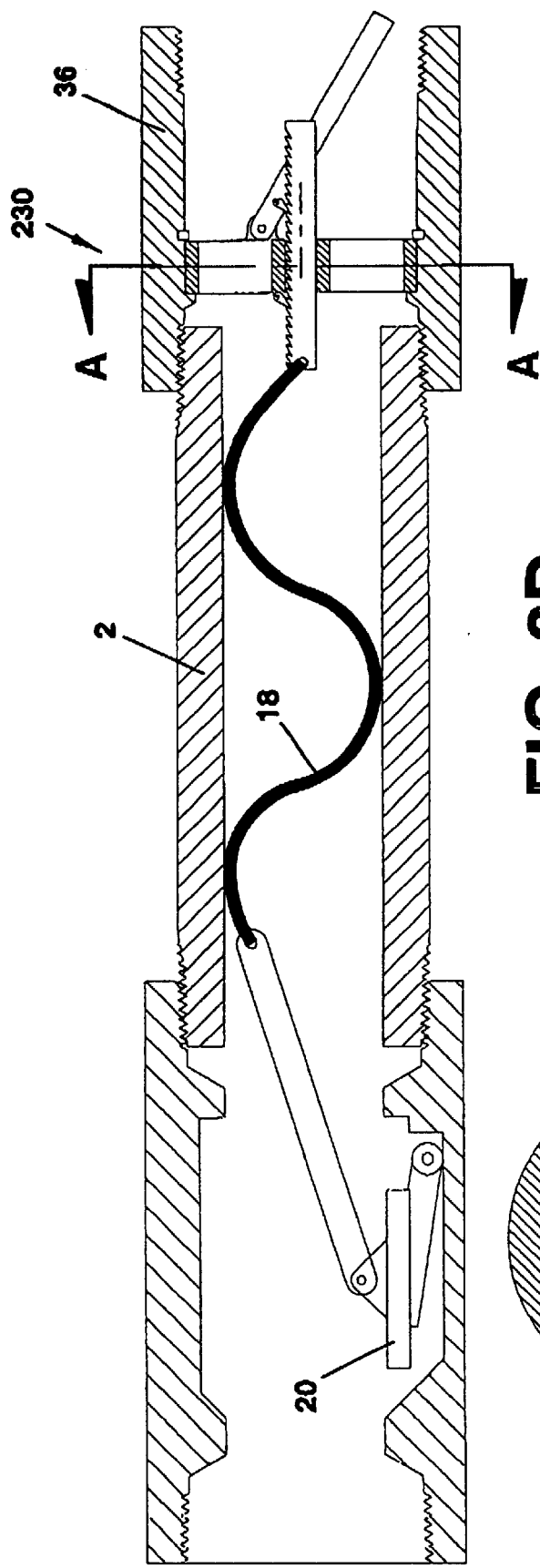
FIG. 3D shows an alternative loading mechanism holding a flapper type valve when open.
Figure 3E:

FIG. 3C illustrates the break in the hose 2 which effectively releases a compressive force of the cable 18 on the member 226, causing the valve 20 to move to the closed position, as shown in FIG. 3C. FIG. 3D illustrates an alternative cable loading mechanism 230 for maintaining a compressive force on the cable 18 to hold a flapper type valve 52 in the open position. A break in the hose 20 will thus release the compressive force on the cable and allow the valve to move to the closed position. When the cable is in compression, the safety kit for use with a flexible hose includes a cable loading mechanism for positioning at the end of the hose opposite the control housing to load the cable in compression. Upon hose separation, the resulting growth in the length of the cable 18 moves the valve to the closed position.

Figure 4:
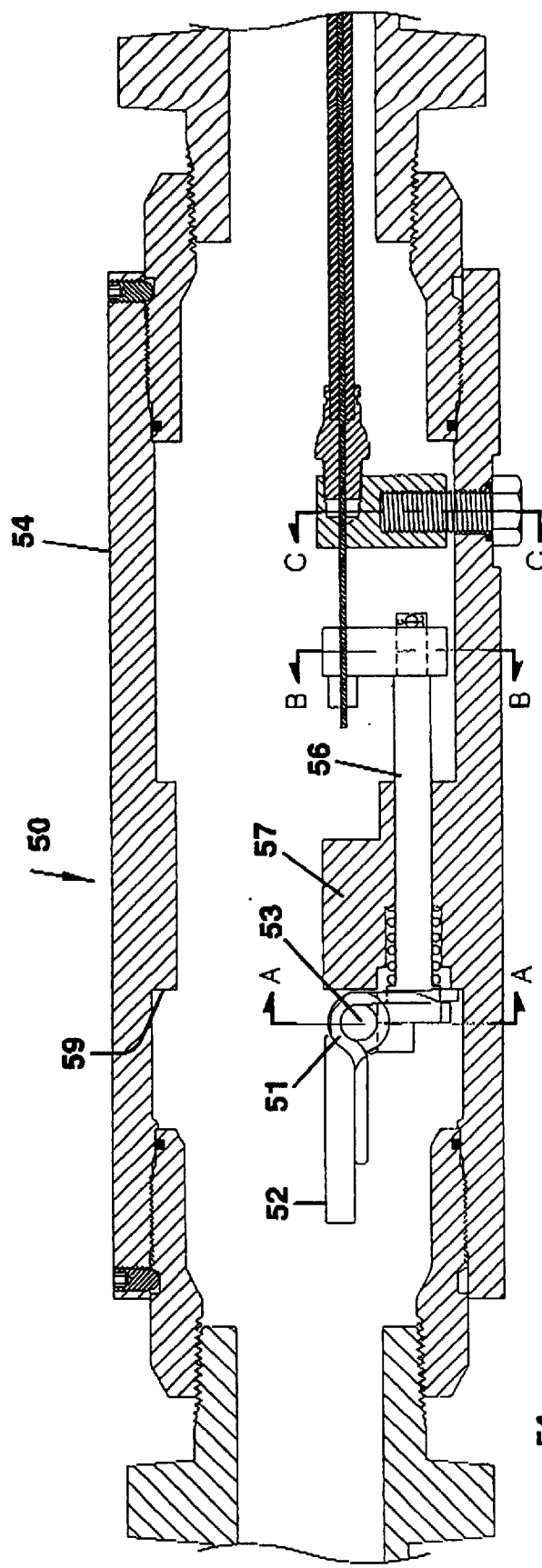
FIG. 4 is a cross-section of a control housing with a flapper-type valve held open by a cable in tension.
Figure 4B:
FIG. 4B is a cross-section taken along lines B—B in FIG. 4.
Figure 4A:
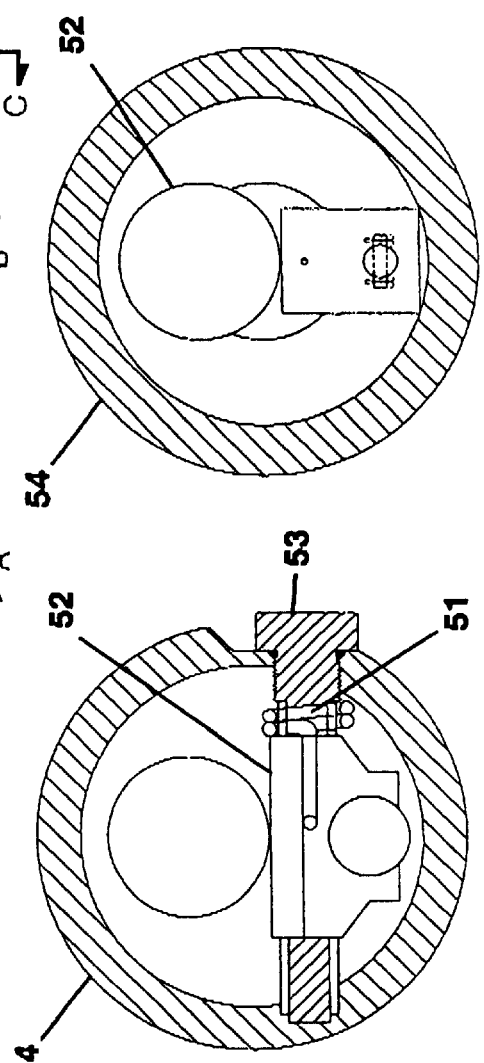
FIG. 4A is a cross-section of the control housing shown in FIG. 4 taken along lines A—A.

FIGS. 4, 4A, and 4B show a flapper assembly 50 in an alternate embodiment using a flapper-type valve 52 instead of a piston-type valve as shown in FIG. 2. Valve 52 is pivotally attached to control housing 54 with pin 53. The trigger 56 is slidably moveable within trigger support 57, which is also secured to the housing 54. Coil spring 51 (see FIG. 4A) will close the valve 52 against valve seat 59 if trigger 56 is moved from its neutral position with respect to trigger support 57. Cable 18 is fixed to the trigger 56, such that movement of the cable when the hose fails will displace the trigger 56 from the neutral position to the hose break position, allowing the valve 52 to pivotally engage the valve seat 59, closing off flow through the flexible hose.

Figure 5:
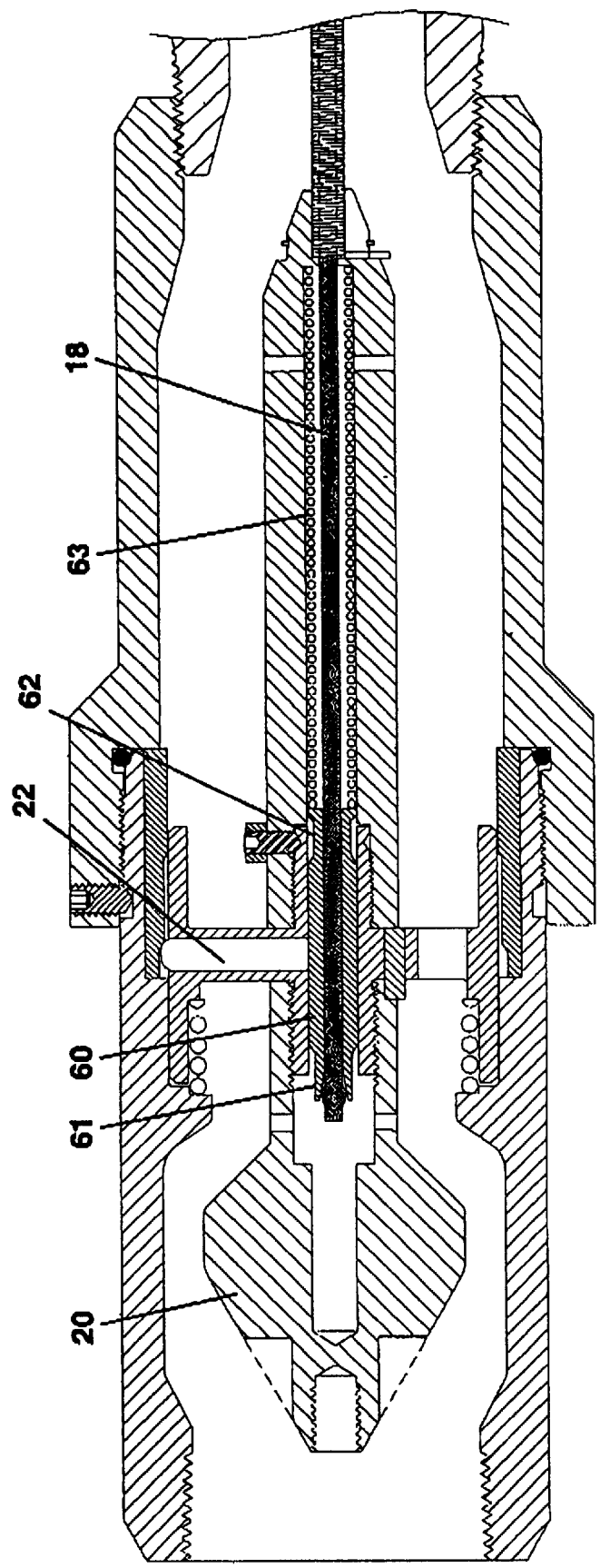
FIG. 5 illustrates a control housing with a trigger having a neutral position, a hose break position, and a cable break position.

Another possible failure of a safety hose system may occur if the cable integrity is lost, i.e., if the cable breaks, or if an end of the cable 18 is disconnected from the cable support housing 36 or the trigger. If the cable integrity is lost, e.g., the cable is cut or disconnected, the cable 18 will not displace the trigger 24 to close off flow. As a precaution, a "cut safety" mechanism may be incorporated into the kit assembly to shut off the valve automatically if the cable breaks. FIG. 5 illustrates one embodiment of a cut safety mechanism using the preferred piston-type valve 20. The double-throw trigger 60 comprises both a first reduced-diameter neck 61 for activating the valve during a hose failure, and a second reduced-diameter neck 62 for activating the valve during a cable failure. The trigger 60 is biased by spring 63, such that during a cable failure, the trigger 60 is urged in a direction that will align the neck 62 with the pins 22, allowing the valve to close. By biasing the trigger to the cable cut position, cable 18, if cut or if integrity along the length of the cable is otherwise lost, the trigger will move to the cable cut position and the valve will automatically close.

Figure 6:
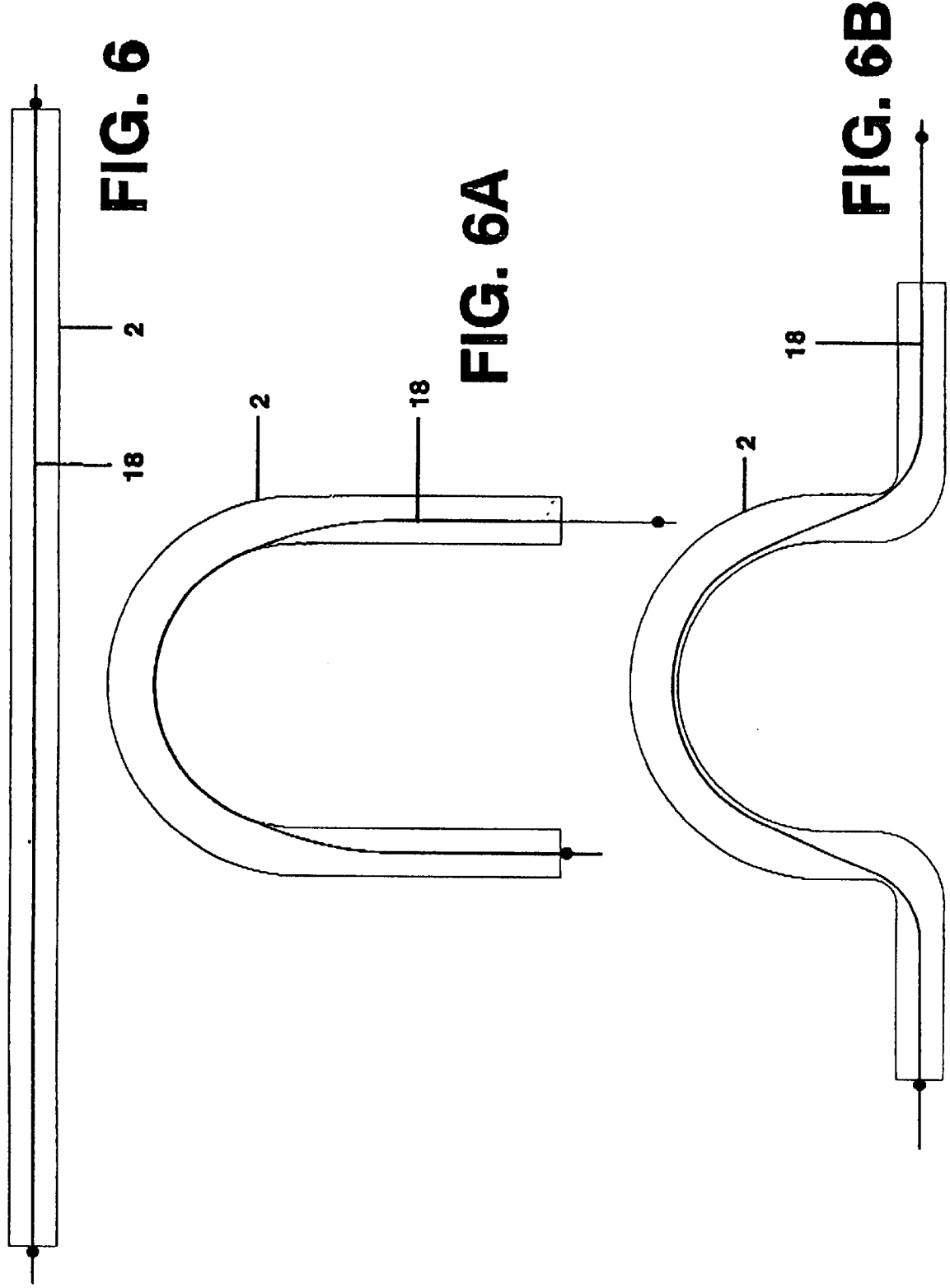
FIG. 6 conceptually shows a hose and a cable between the ends of the hose.

FIG. 6 illustrates one of the difficulties of using a cable within the flexible hose to activate a cut safety mechanism.

As the hose is bent during use or coiled during storage, an end of the cable will be displaced relative to an end of the hose. This is because the cable under tension takes the shortest path through the hose. As the hose is bent, the cable displacement may trigger the cut-safety mechanism, causing the valve to undesirably close.

A cable length compensator may be used to prevent activation of the cut safety system in response to a change in position of the cable with respect to the hose when the hose is bent. In one embodiment, the fail safe feature for the cable cut situation is incorporated to allow the trigger to be pushed by a biasing spring to a cable cut position in the event of a cut or disconnected cable, thereby automatically closing the valve. This approach may result, however, in a very long trigger since the cable will "grow" over 8 inches when a 20 foot hose is curled in a double loop. Compensating for this effect with a longer trigger may result in an unacceptably long and cumbersome device on the end of the hose which is handled by the operator at every loading operation. FIG. 7 illustrates a flapper valve version of the kit where the trigger 61 is allowed to travel in the spring biasing direction and a trip condition is achieved. The valve 52 is free to swing clear of the trigger 61 when the trigger is tripped to the cut position.

Figure 8:
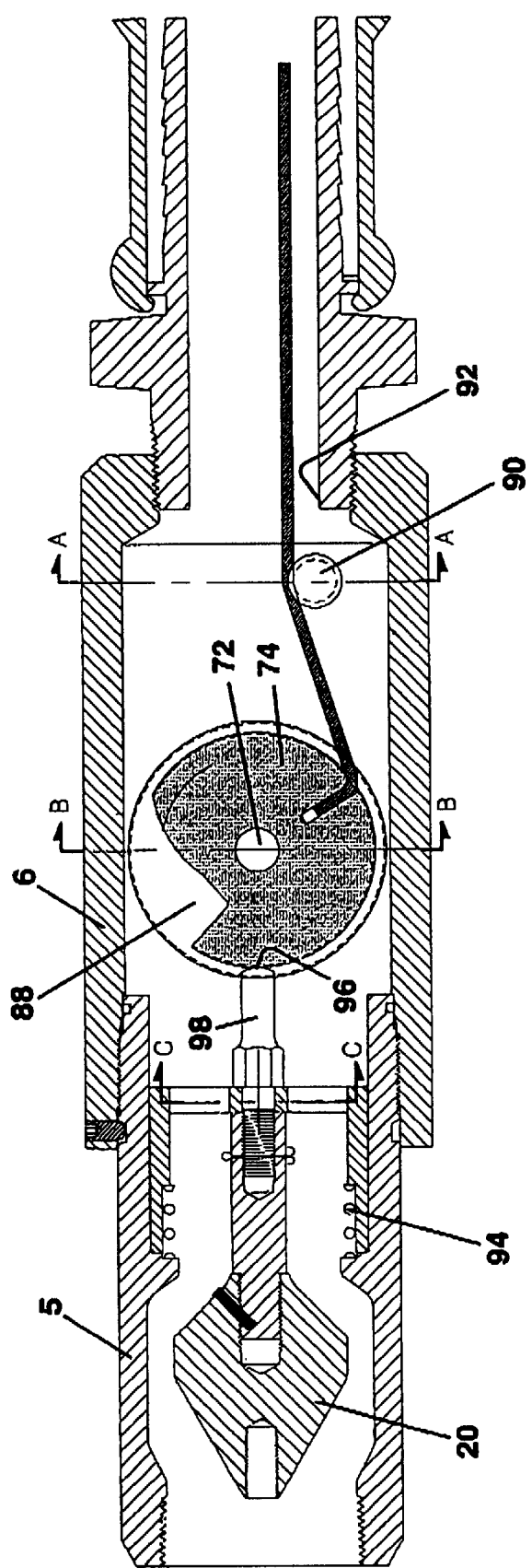
FIG. 8 illustrates a safety kit with a drum for winding a portion of the cable about the drum when the flexible hose is bent.
Figure 8A:
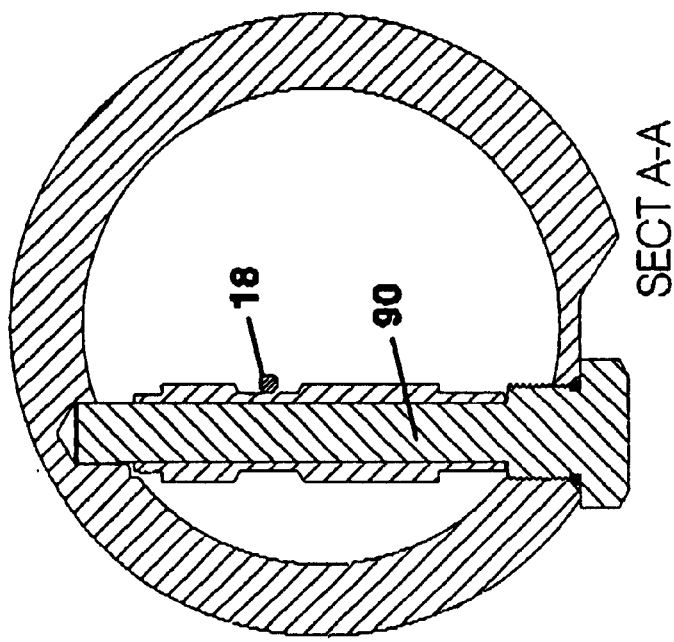
FIG. 8A is a cross-section along lines A—A in FIG. 8.
Figure 8B:
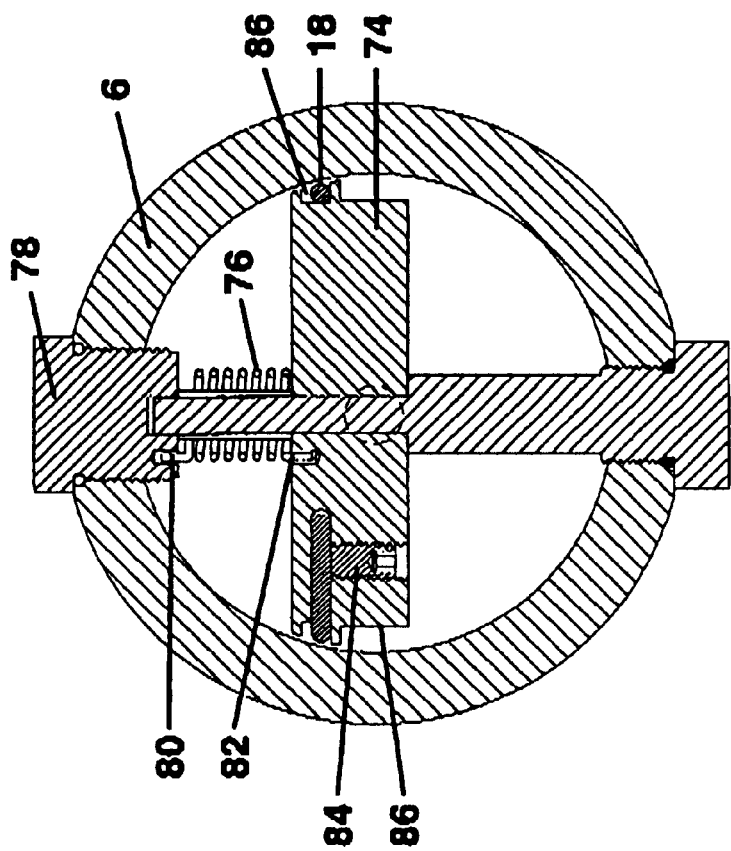
FIG. 8B is a cross-section along lines B—B in FIG. 8.

A more practical design for dealing with the change in length of the cable as the hose is curled is embodied in a drum-type device which employs a trigger as part of the drum. As shown in FIG. 8, shaft 72 supports the drum 74 as it rotates within the housing 6, and spring 76 (shown in FIG. 8B) biases the drum in the clockwise direction as shown in FIG. 8. The spring 76 is loaded during assembly of a loading plug 78 (see FIG. 3B) into the wall of the housing 6. The spring tangs 80 and 82 engage the hole in the plug 78 and the drum 74, respectively once the loading plug 78 is threaded into desired position. Cable 18 is held in the drum by a set screw 84. The upper portion of the drum contains a groove 86 which contains the cable as it winds the drum 74. The lower portion of the drum contains a tripping cam surface 86 along which is positioned a tripping slot or cut-out 88, as shown in FIG. 8. Shaft 90 as shown in FIGS. 8 and 8A guides the cable from engagement with any sharp edge 92 of the hose connector.

The spring 94 biases the valve member 20 to the closed position. End 96 of the trigger shaft rides on the cam surface 86 and holds the valve 20 open until the drum 74 rotates into a position that allows the trigger shaft to drop into the trigger slot 88. FIG. 8 shows the device in its home or neutral position with a straight flexible hose. The cable 18 will pull from that position to a hose break position as a result of an actual pullaway or hose separation (hose break), but will remain in its home position as a result of normal curling or bending of the flexible hose.

Figure 9:
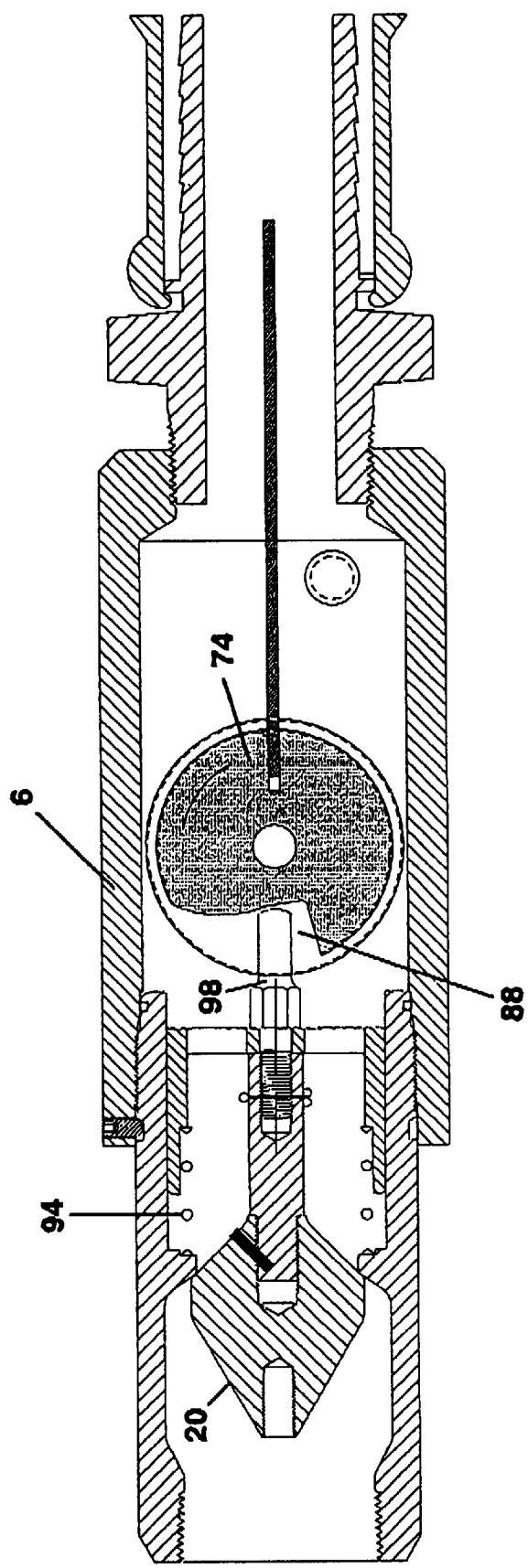
FIG. 9 illustrates the drum position during hose separation to close the valve.

FIG. 9 shows the effect of the cable pull due to a hose break. The drum rotates counterclockwise as the cable pulls until the trigger shaft drops into a trigger slot 88 and spring 94 biases the valve 20 closed, along with the force of the flowing fluid through the control housing.

Figure 10:
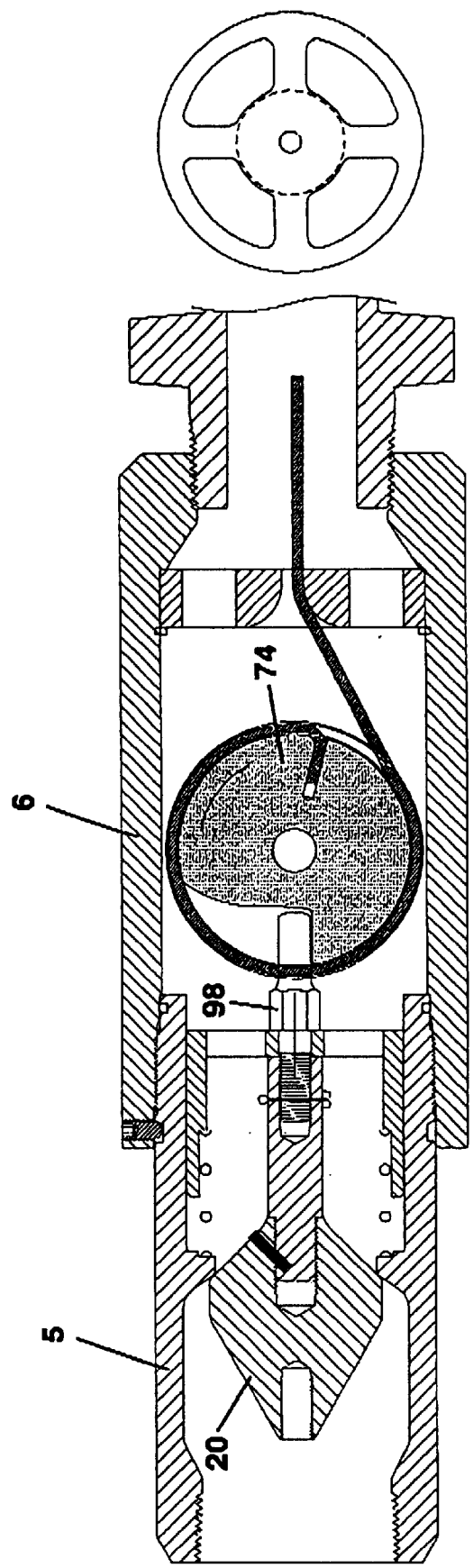
FIG. 10 illustrates the drum position when cable integrity is lost.

A cut cable or hose-loop condition is shown in FIG. 10. The cable goes slack when the cable integrity is lost, and the drum 74 rotates clockwise from the bias of the spring 76 until the trigger shaft 98 drops into the trigger slot 88, allowing the valve to close. This design can easily compensate for about six inches of cable slack, which is more than that normally encountered during use of a hose. If the cable should loop more than that compensated by the drum, the valve 20 will close, but when the hose is straightened back out, the valve 20 will again open itself and be ready for operation. A ramp or cam surface 86 is preferably provided on one side of the drum which, when the hose is straightened and the cable rotates the drum in a counterclockwise direction, will contact the end of the trigger shaft 98 and reopen the valve 20.

Figure 11:
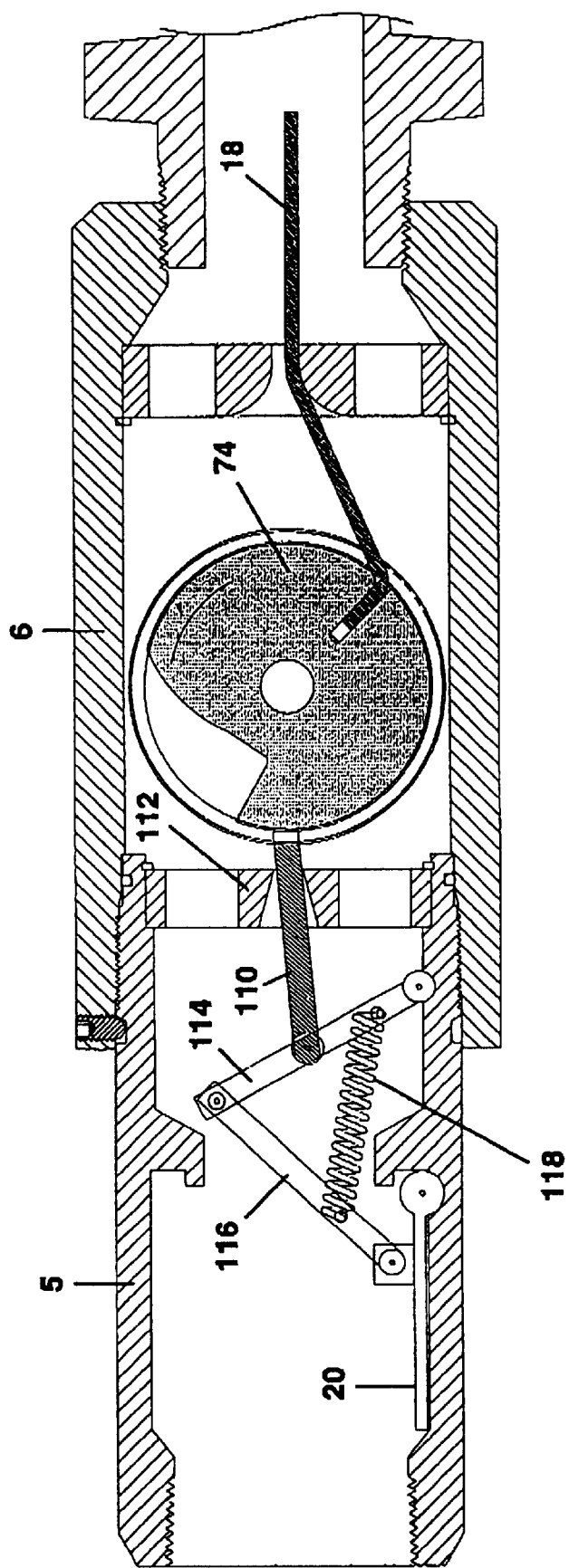
FIG. 11 illustrates a drum used in conjunction with a flapper-type valve.
Figure 12:
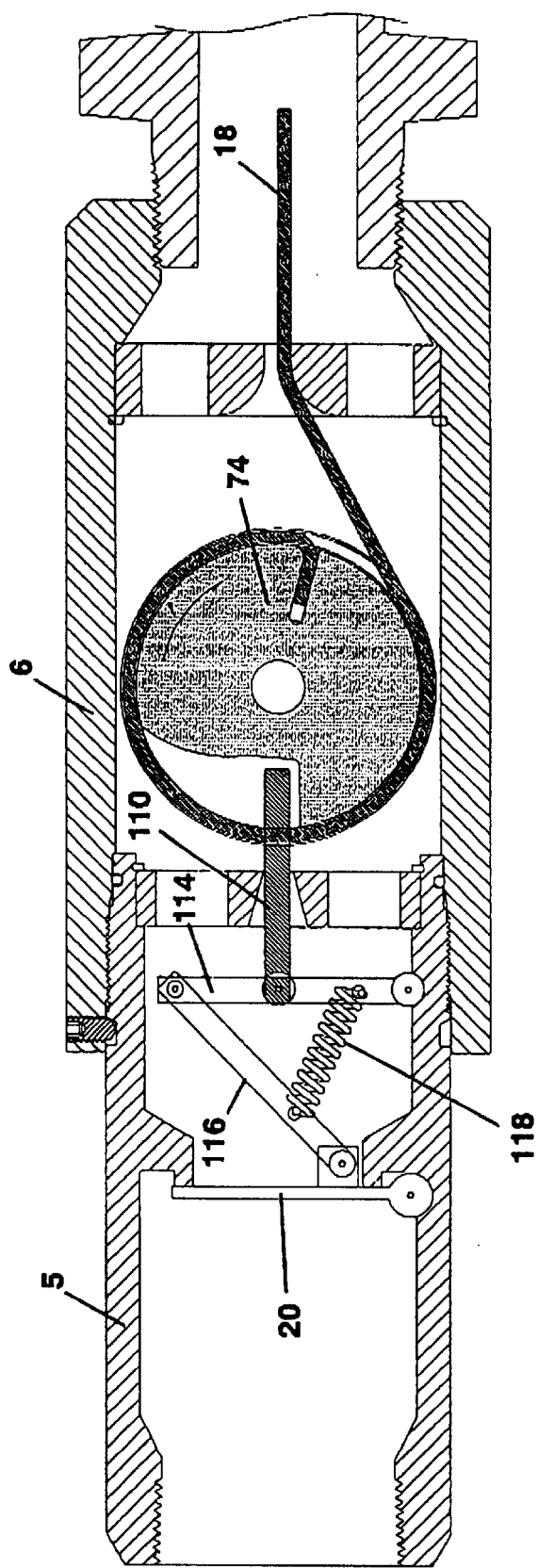
FIG. 12 illustrates a flapper-type valve in the closed position.

FIG. 11 illustrates the drum 74 for use as a cable compensation mechanism for holding the flapper valve 20 in the open position, and for allowing the flapper valve to move to the closed position as shown in FIG. 12 in response to a loss of integrity of the cable 18. Trigger 110 is guided by a spider 112 or other guide mechanism for engagement with the outer surface of the drum 74. A link 114 is pivotally connected to the housing 5, and link 116 is pivotally connected to flapper valve 20. Spring 118 biases valve 20 in the closed position. Upon release of the trigger 110 to the cable break position as shown in FIG. 12, link 114 pivots toward the drum, thereby allowing the spring 118 to pivot the valve 20 to the closed position, automatically shutting off flow to the hose.

A preferred embodiment of the present invention includes a highly reliable and low cost cable sheath technique for compensating for a change in cable length. Using this technique, the length-changing cable in the flexible hose 2 results in a very small change in the length of the cable for a straight hose compared to a hose with one or more bends. By providing a sheath cable, wherein the sheath may be wire wound of the type used for one lawnmower throttles, an incompressible but relatively flexible wire may be used for the cable since the device operates in a pull direction. In a preferred embodiment of the present invention, the cable is in tension and is relatively flexible, and the sheath presents no problems since it is in compression between the control housing and the cable support housing, and its ability to stretch is of no consequence.

Figure 13:
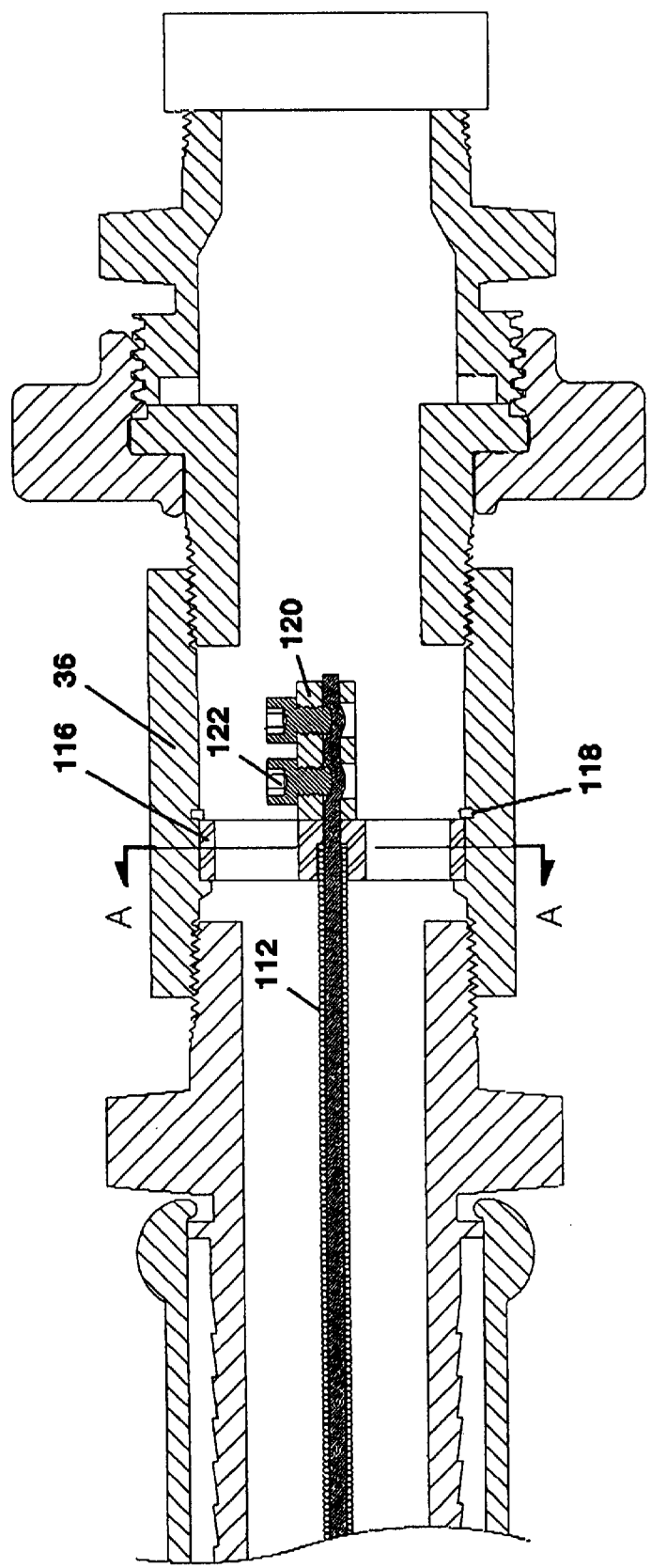
FIG. 13 illustrates a suitable connection between an end of the cable and the cable support housing.
Figure 13A:
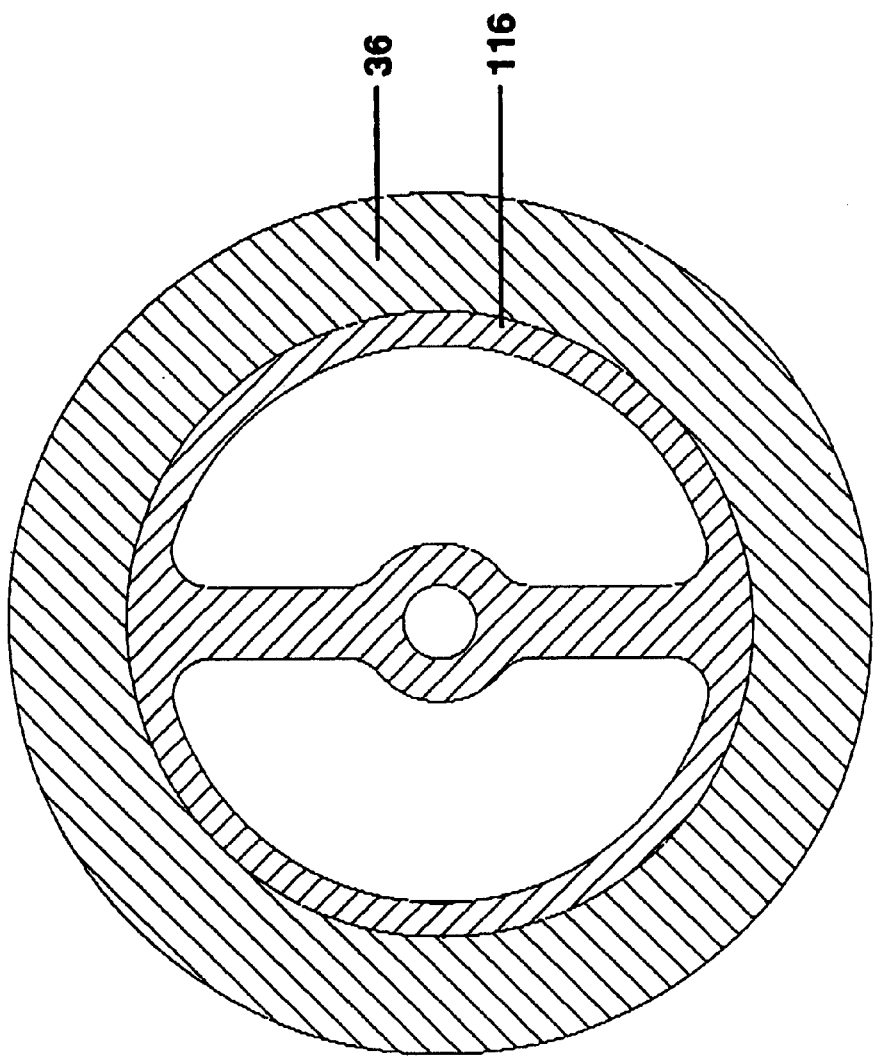
FIG. 13A is a cross-section taken along lines A—A in FIG. 13.

FIG. 7 illustrates a cable sheath restraint block 110 which is attached to the cable sheath 112 by a fitting 114. The cable 18 is free to slide within the cable sheath 112. The other end of the cable sheath is positioned within a bore in the cable restraint spider 116, which is held in position by a snap ring 118 as shown in FIG. 13. The spider 116 is better illustrated in FIG. 13A. Sheath 112 preferably is not secured to the spider 116 since the sheath is free to fall out of the bore in the event of hose separation during pullaway. The cable sheath 112 also preferably is longer than necessary in a straight hose condition so that the sheath, which is substantially incompressible in length, is mounted in compression between the end housings, even when the hose is straight. The outer diameter of the sheath is substantially less than the inner diameter of the flexible hose. Cable 18 may be restrained at the outlet end of the hose by a cable clamp 120 using cap screws 122. The hose safety kit may thus be transferred to another hose of the same or a shorter length by removing the cable clamp from the outlet end of the hose, removing the control valve and cable from the upstream end of the hose, then installing the safety kit in the other hose. The benefit of allowing field assembly of the safety kit in the existing hose is a significant feature of the invention.

Figure 14:
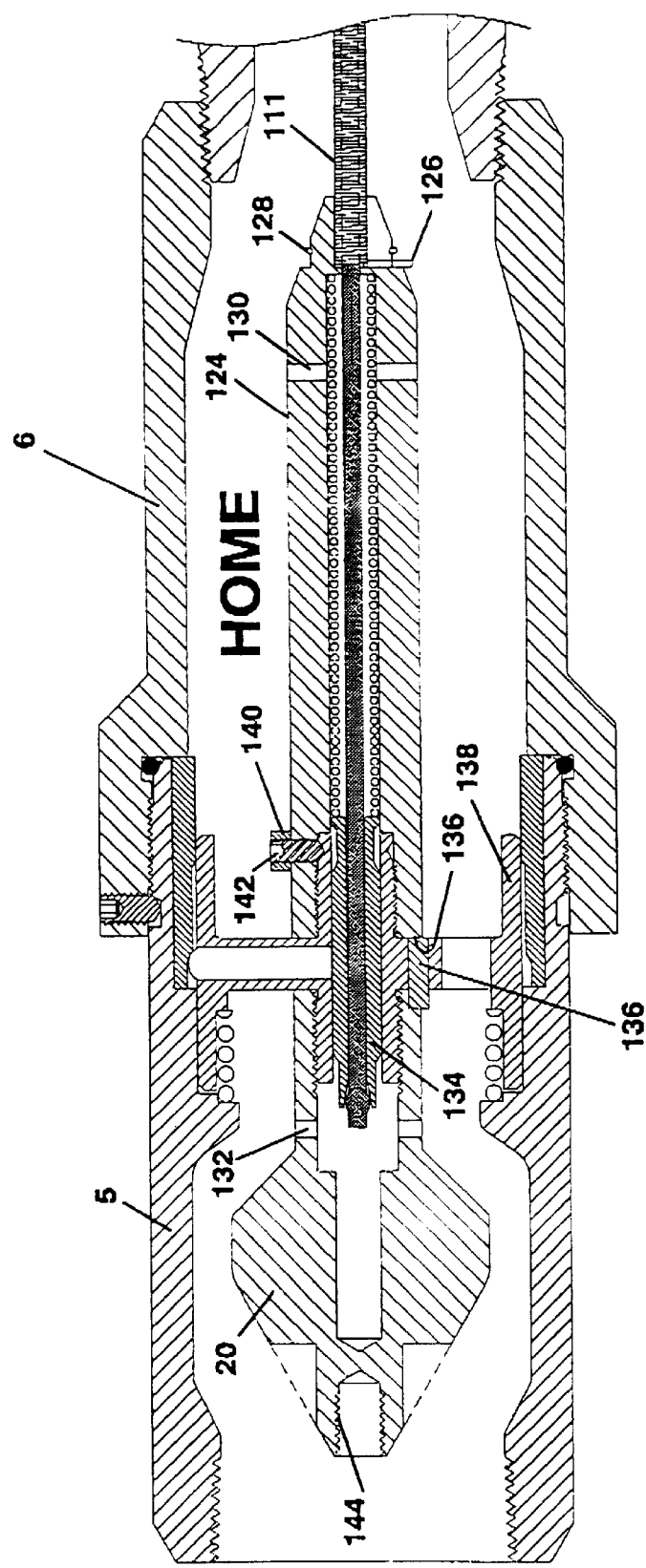
FIG. 14 illustrates the control housing with a trigger having a neutral position, a cable break position, and a hose break position.

Referring to FIG. 14, the cable sheath may be attached to the spring housing 124 by forming a 126 tang on one end of the cable sheath and trapping the tang 126 with a snap ring 128 into a slot milled in the end of the spring housing. Breather holes 130 and 132 may be provided to prevent hydraulic lock of the trigger 134 if the product were to become flooded. Lock pin 136 locks valve 20 to housing 5 and is trapped in position by the end 136 of the spring housing 124. The spring housing 124 is locked to the trigger housing 138 with set screws 142 and lock nut 140. A threaded port 144 is provided for permitting threading of a standard bolt into the valve 20 to be used for manually re-cocking valve after test triggering of the device.

The kit according to the present invention may be shipped with a cable and all of the components necessary to install the kit in a standard hose. For the embodiment wherein the cable is in tension when the trigger is in the neutral position, the installation procedure involves mounting the outlet housing or cable position housing to one end of the hose, measuring the overall length of the hose including the outlet housing, then cutting the cable sheath to the combined length of the hose and the outlet housing. The cable sheath may then be slid over the cable and an end tang of the sheath fastened to the spring housing with a snap ring. The cable and the sheath may then be threaded through the flexible hose from the upstream end and the control housing made up to the end of the hose. The control housing is supplied with the trigger in the "trip pull" mode which has spring 63 compressed and pins 22 resting on reduced diameter 61, as shown in FIG. 5. The cable may be connected to the spider and pulled up snug to the cable sheath. A cable clamp may be used to secure the end of the cable approximately ½" from the face of the spider, which is placed in the outlet housing bore and retained with a snap ring. With the hose straight, a bolt may be used to engage the valve and cock the valve open. If the valve stays open, the cable length is correct. If the valve does not stay open, the cable clamp may be moved a selected distance closer to the spider (further from the downstream end of the cable). The hose may be tested by manually pulling the cable to trip the valve closed. With the valve open and the hose curled into two tight loops, the trigger should move but the valve does not close. If the valve does trip in this condition, the hose may be restraightened and a cable clamp moved a selected distance farther from the spider face (closer to the downstream end of the cable).

It should be understood from the foregoing disclosure that various types of valve members may be used in the kit of the present invention. A piston-type or poppet valve member is preferred, but a flapper-type valve, a valve with wedge members as shown in the prior art patents discussed above, or another type of valve could be used, depending on the circumstances under which the flexible hose is used. The kit is disclosed herein for use with an existing flexible hose renders the hose safe in the event of a hose break and/or loss of cable integrity. Embodiments have been disclosed wherein the cable is in compression, although in a preferred embodiment the cable is in tension. The trigger preferably has a cable cut position for automatically closing the valve if cable integrity is lost, regardless of the valve type.

The foregoing disclosure and description of the invention is illustrative and explanatory of preferred embodiments. It would be appreciated by those skilled in the art that various changes in the size, shape of materials, as well in the details of the illustrated construction or combination of features and methods discussed herein maybe made without departing from the spirit of the invention, which is defined by the following claims.

What is claimed is:

1. A safety kit for use with a flexible hose for interconnecting a portable tank with another tank to transmit fluids between the portable tank and the another tank, the safety kit comprising:

a control housing adapted for securing to one end of the hose, the control housing containing a valve member moveable relative to a seating surface for opening and closing flow through the control housing;

a cable for positioning within the flexible hose in compression to retain the valve member in an opened position, such that fluid may be transmitted between the portable tank and the another tank; and a cable support housing adapted for securing to an opposing end of the flexible hose, the cable support housing including a cable loading mechanism for placing the cable in compression to hold the valve member open.

2. A safety kit as defined in claim 1, further comprising:

a trigger connected with the cable and moveable from a neutral position for maintaining the valve member open to a hose break position upon rupture of the hose to move the valve member to a closed position.

3. A safety kit as defined in claim 1, wherein the cable loading mechanism includes a screwjack base fixed with respect to the cable support housing and a screwjack threadably moveable relative to the screwjack base and connected to the cable, such that rotation of the screwjack places the cable in compression within the flexible hose.

4. A safety kit as defined in claim 1, wherein the cable loading mechanism includes a ratchet mechanism fixed with respect to the cable support housing, the ratchet mechanism comprising a ratchet arm connected to the cable and a ratchet lever for advancing the ratchet arm for placing the cable in compression within the flexible hose.

5. A safety kit as defined in claim 1, further comprising:

a backcheck valve adjacent the opposing end of the flexible hose.

6. A safety kit as defined in claim 5, wherein the back check valve is provided within a back check housing spaced opposite the cable support housing with respect to the control housing.

7. A safety kit as defined in claim 1, further comprising:

a biasing member for biasing the valve member closed.

8. A safety kit as defined in claim 1, wherein the valve is a piston-type valve.

9. A safety kit as defined in claim 1, wherein the valve is a flapper-type valve.

10. A safety kit as defined in claim 1, further comprising:

an adjustment device for selectively adjusting the position of the cable with respect to the cable support housing.

11. A safety kit for use with a flexible hose for interconnecting a portable tank with another tank using a flexible hose to transmit fluids between the portable tank and the another tank, the safety kit comprising:

a control housing adapted for securing to a control end of the hose, the control housing containing a valve member moveable relative to a seating surface for opening and closing flow through the control housing;

a trigger moveable from a neutral position for maintaining the valve member open to a hose break position in response to a tensile force of the cable on the trigger for allowing the valve member to move to the closed position;

a cable for positioning in tension within the flexible hose to retain the trigger in the neutral position to keep the valve member open, such that fluids may be transmitted between the portable tank and the another tank; and a cable support housing adapted for securing to an opposing end of the flexible hose opposite the control housing for securing the cable in a fixed axial position with respect to the opposing end of the flexible hose.

12. A safety kit as defined in claim 11, wherein the trigger includes a cable break position for closing the valve member in response to a change in the integrity of the cable.

13. A safety kit as defined in claim 12, further comprising:
a trigger biasing member to bias the trigger to the cable break position.

14. A safety kit as defined in claim 12, further comprising:
a cable length compensator for preventing activation of the trigger to the cable break position in response to bending of the flexible hose.

15. A safety kit as defined in claim 14, wherein the cable length compensator is an outer sheath enclosing the cable and extending between the cable support housing and the control housing.

16. A safety kit as defined in claim 14, wherein the cable length compensator comprises a long-throw trigger, the neutral position being axially spaced from the cable break position, such that bending of the flexible hose moves the trigger from the neutral position and activation of the trigger to the cable break position occurs upon trigger displacement in excess of a trigger activation distance.

17. A safety kit as defined in claim 14, wherein the cable length compensator comprises a drum for winding a portion of the cable about the drum during bending of the flexible hose.

18. A safety kit as defined in claim 17, further comprising:
a ramp rotatable with the drum for contacting the trigger, such that rotation of the drum by an angular activation displacement guides the trigger to the cable break position.

19. A safety kit as defined in claim 11, further comprising:
a biasing member for biasing the valve member closed when the trigger is in the hose break position.

20. A safety kit as defined in claim 11, further comprising:
a back check valve adjacent the opposing end of a flexible hose.

21. A safety kit as defined in claim 20, wherein the back check valve is provided within a back check housing spaced opposite the cable support housing with respect to the control housing.

22. A flexible hose assembly as defined in claim 11, wherein the valve is one of a piston-type valve and a flapper-type valve.

23. A method of automatically closing off flow through a flexible hose when interconnecting a portable tank with another tank using a flexible hose to transmit fluids between the portable tank and the another tank, the method comprising:
securing a control housing to a control end of the hose, the control housing containing a valve member moveable relative to a seating surface for opening and closing flow through the control housing;
positioning a trigger with respect to the control housing, the trigger moveable from a neutral position for retaining the valve member open to a hose break position for allowing the valve member to move to a closed position;
securing a cable support housing to a cable support end of the flexible hose; and
positioning a cable within the flexible hose, securing one end of the cable to the trigger and the other end of the cable to the cable support housing, thereby maintaining the trigger in the neutral position while the hose remains intact, such that fluids may be transmitted between the portable tank and the another tank.

24. A method as defined in claim 23, wherein the trigger has a cable break position for closing the valve member in response to a change in the integrity of the cable.

25. A method as defined in claim 24, wherein the trigger is biased to the cable break position.

26. A method as defined in claim 24, further comprising:
providing a cable length compensator for preventing activation of the trigger to the cable break position in response to a change in position of the cable within the intact flexible hose.

27. A method as defined in claim 26, wherein the cable length compensator is an outer sheath enclosing the cable and extending between the cable support housing and the control housing.

28. A method as defined in claim 26, further comprising:
automatically winding a portion of the cable about a drum when the cable moves within the flexible hose.

29. A method as defined in claim 24, wherein the cable break position is spaced opposite the hose break position with respect to the neutral position.

30. A method as defined in claim 23, further comprising:
providing a back check valve opposite the cable support housing with respect to the control housing.

31. A method as defined in claim 23, wherein the cable is cut to a selected length after measuring the length of the flexible hose.

32. A method as defined in claim 23, wherein the cable is secured to the cable support housing such that the position of the cable with respect to the cable support housing is adjustable.

33. A method as defined in claim 32, further comprising:
testing the hose for safety by bending the flexible hose and observing movement of the valve member; and
adjusting the position of the cable in response to the observed movement of the valve member.

34. A method as defined in claim 23, further comprising:
biasing the valve member closed when the trigger is in the hose break position.

\* \* \* \* \*